United States Patent [19]

Gagliardi

[11] Patent Number: 5,415,881
[45] Date of Patent: May 16, 1995

[54] ANIMAL MUSCLE STRIP PRODUCT

[75] Inventor: Eugene D. Gagliardi, Atglen, Pa.

[73] Assignee: Designer Foods, Inc., Wilmington, Del.

[21] Appl. No.: 293,788

[22] Filed: Aug. 22, 1994

Related U.S. Application Data

[62] Division of Ser. No. 961,231, Oct. 15, 1992, Pat. No. 5,346,711.

[51] Int. Cl.⁶ .......................... A23L 1/31; A23L 1/315
[52] U.S. Cl. ...................................... 426/76; 426/104; 426/641; 426/643; 426/644
[58] Field of Search ............... 426/644, 518, 641, 513, 426/104, 643, 76

[56] References Cited

U.S. PATENT DOCUMENTS

| | | | |
|---|---|---|---|
| 2,228,414 | 1/1941 | Spang | 426/518 X |
| 3,717,473 | 2/1973 | Bissett | 426/641 X |
| 4,387,111 | 6/1983 | Mullender | 426/518 X |
| 4,818,556 | 4/1989 | Hoashi | 426/104 X |
| 5,030,472 | 7/1991 | Logan | 426/641 |
| 5,069,914 | 12/1991 | Gagliardi | 426/104 X |

FOREIGN PATENT DOCUMENTS

| | | | |
|---|---|---|---|
| 2-49562 | 2/1990 | Japan | 426/643 |
| 2-49563 | 2/1990 | Japan | 426/643 |

Primary Examiner—Arthur L. Corbin
Attorney, Agent, or Firm—Panitch Schwarze Jacobs & Nadel

[57] ABSTRACT

A food product which is formed from a breast cut of poultry or other animal muscle material having a core area and a plurality of strips of breast formed integrally with the core area and extending outwardly therefrom in a random manner. The food product is formed by cutting the first and second end surfaces along first and second cut lines, respectively, extending between the upper and lower surfaces of the food product, a distance which establishes an uncut core area between the first and second end surfaces. The food product is then cut from the upper surface to the lower surface along a plurality of spaced generally parallel third and fourth cut lines extending between the first end surface and the core area and the second end surface of the core area, respectively, such that a plurality of strips of material extend outwardly from the core area in a random manner toward the first and second end surfaces.

14 Claims, 1 Drawing Sheet

ANIMAL MUSCLE STRIP PRODUCT

CROSS-REFERENCE TO RELATED APPLICATION

This application is a division of U.S. application Ser. No. 07/961,231, filed Oct. 15, 1992, now U.S. Pat. No. 5,346,711.

FIELD OF THE INVENTION

The present invention relates to a food product and method of making the same and, more particularly, to a food product which includes a core area and a plurality of strips of edible material extending from the core area in a random manner.

BACKGROUND OF THE INVENTION

Poultry is conventionally eviscerated and dressed and sold either as a whole or as parts. One of the parts is the breast cut, which is marketed with the bone therein or as a boneless breast cut. In view of the increasing demand for such new, innovative products as boneless breasts, tenders, wings, etc., for both the commercial food market and for home use, methods for easily obtaining different types of cuts have become increasingly more desirable. However, the prior art methods of producing dressed cuts of poultry have not been directed to a breast cut which has been dressed to permit the consumer to conveniently break down the breast cut into finger food.

The present invention comprises a method of dressing an edible material, such as a breast cut of poultry, such that the material has a core area and a plurality of strips of material formed integrally with the core area and extending outwardly therefrom in a random manner. This dressing allows the consumer to readily break off the strips of material with their fingers for easy consumption. The present invention is expected to gain widespread consumer acceptance. The method of the present invention is relatively quick and easy to carry out and results in a food product which is both appetizing and convenient for the consumer to handle.

SUMMARY OF THE INVENTION

Briefly stated, the present invention comprises a method of making a food product from an edible material having an upper surface and a lower surface. The upper and lower surfaces are spaced apart and extend generally parallel with respect to each other. The material includes a first end surface and a second end surface. The first and second end surfaces are spaced apart a first distance. The method comprises:

Cutting through the first end surface of the material along a first cut line extending between the upper and lower surfaces a second distance. Cutting through the second end surface of the material along a second cut line extending between the upper and lower surfaces a third distance. The third distance when combined with the second distance is less than the first distance to establish an uncut core area between the first and second end surfaces. The material is then cut from the upper surface to the lower surface along a plurality of spaced generally parallel third cut lines extending between the first end surface and the core area. The material is then cut from the upper surface to the lower surface along a plurality of spaced generally parallel fourth cut lines extending between the second end surface and the core area whereby a plurality of strips of material extend from the core area toward the first and second end surfaces.

BRIEF DESCRIPTION OF THE DRAWING

The foregoing summary, as well as the following detailed description of the presently preferred embodiment of the invention will be better understood when read in conjunction with the appended drawing. For the purpose of illustrating the invention, there is shown in the drawing, an embodiment which is presently preferred. It should be understood, however, that the present invention is not limited to the particular arrangement and instrumentalities shown. In the drawing.

DESCRIPTION OF PREFERRED EMBODIMENT

Figure 1:
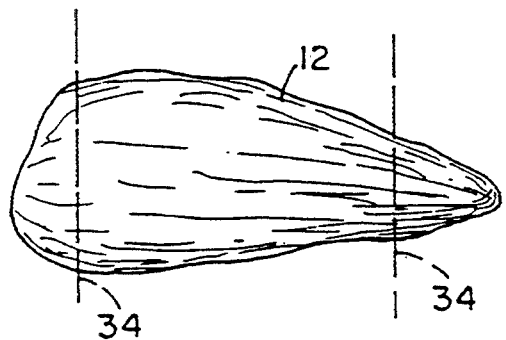
FIG. 1 is a top plan view of an undressed breast cut of poultry with cut lines added to show the method of dressing in accordance with the present invention.

Certain terminology is used in the following description for convenience only and is not limiting. The words "right," "left," "lower" and "upper" designate directions in the drawing to which reference is made. The words "inwardly" and "outwardly" refer to directions toward and away from, respectively, the geometric center of the food product and designated parts thereof. The terminology includes the words above specifically mentioned, derivatives thereof and words of similar import.

Figure 4:
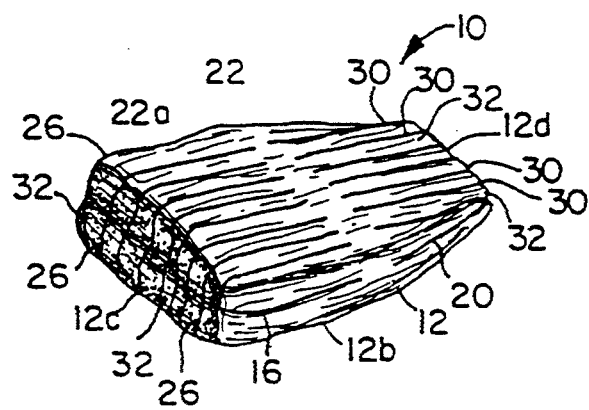
FIG. 4 is a perspective view of a breast cut which has been dressed in accordance with the method of the present invention.
Figure 5:
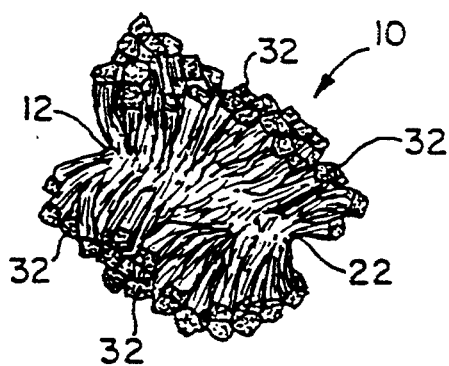
FIG. 5 is a perspective view of a cooked food product in accordance with the present invention.

Referring to the drawing in detail, wherein like numerals indicate like elements throughout, there is shown in FIGS. 4 and 5 a preferred embodiment of a food product, generally designated 10, made in accordance with the present invention. Referring now to FIG. 4, in the present embodiment, it is preferred that the food product 10 be made from an edible material 12 having an upper surface 12a and lower surface 12b. The upper and lower surfaces 12a, 12b are spaced apart by a distance established by the thickness of the material 12 and extend generally parallel to each other. The edible material includes a first end surface 12c and a second end surface 12d. The first and second end surfaces 12c, 12d are spaced apart a first distance.

In the present embodiment, it is preferred that the edible material 12 be a cut of a breast of poultry, such as chicken. However, it is understood by those skilled in the art that the present invention is not limited to any particular type of edible material 12. For instance, the edible material could be meat, poultry, dough or fish without departing from the spirit and scope of the invention.

As shown in FIG. 4, a first cut extends through the first end surface 12c along a first cut line 16 extending generally parallel to the upper surface 12a. The first cut extends into the material 12 a second distance which is preferably less than one-half the first distance. A second cut extends through the second end surface 12d along a second cut line 20 extending generally parallel to the upper surface 12a. The second cut extends into the material 12 a third distance which is preferably less than one-half the first distance and preferably about the same as the second distance to establish an uncut core area 22 between the first and second cuts. More particularly, it is preferred that the third distance plus the second distance be less than the first distance to establish the uncut core area 22 which preferably is located midway between the ends 12c, 12d.

While in the present embodiment it is preferred that the core area 22 be generally centrally disposed between the first and second end surfaces 12c, 12d, it is understood by those skilled in the art that the core area 22 could be positioned closer to one end surface than the other, without departing from the spirit and scope of the invention. It is also understood that the second cut could be omitted and that the first cut could extend almost the entire length of the material 12 such that the core area would be positioned at the second end surface 12d. In the present embodiment, it is preferred that the second and third distances be selected to establish an uncut core area having a width of approximately $\frac{1}{4}$ to $\frac{3}{4}$ of an inch. This distance provides the food product 10 with a sufficiently strong uncut core area 22 to allow the food product 10 to maintain its structural integrity during the cooking process and during consumption. This distance also allows the consumer to conveniently consume the uncut core area 22 with their fingers once the food product 10 has been consumed to the point where only the uncut core area 22 remains. However, it is understood by those skilled in the art that the uncut core area 22 could have any width or depth depending upon the consumer's desires.

It is also preferred that the first and second cuts be generally planar and be positioned generally equidistantly between the upper and lower surfaces 12a, 12b. However, it is understood by those skilled in the art that the first and second cuts could be non-planar or angled with respect to the upper and lower surfaces 12a, 12b without departing from the spirit and scope of the invention.

Referring now to FIG. 4, a plurality of third cuts extend from the upper surface 12a to the lower surface 12b along a corresponding plurality of spaced generally parallel third cut lines 26. The third cut lines 26 extend generally parallel with respect to each other between the first end surface 12c and the core area 22. It it is preferred that the third cut lines 26 extend generally perpendicular to the upper surface 12a but they could be at an angle, if desired. Similarly, a plurality of fourth cuts extend from the upper surface 12a to the lower surface 12b along a corresponding plurality of spaced generally parallel fourth cut lines 30. The fourth cut lines 30 extend generally parallel with respect to each other between the second end surface 12d and the core area 22. In this manner, a plurality of strips of material 32 extend from the core area 22 toward the first and second end surfaces 12c, 12d. Upon deep frying the material 12, the strips 32 extend outwardly from the core area 22 in a random or clustered manner, as best shown in FIG. 5.

As shown in FIG. 4, it is preferred that the third and fourth cut lines 26, 30 extend generally parallel to each other and be spaced a distance with respect to each other within the range of 0.125 to 0.500 inches. However, it is understood by those skilled in the art that the third and fourth cuts could be randomly spaced with respect to each other, extend at angles with respect to each other and extend at an obtuse or acute angle with respect to a longitudinal axis (not shown) of the food product 10 without departing from the spirit and scope of the invention.

Figure 2:
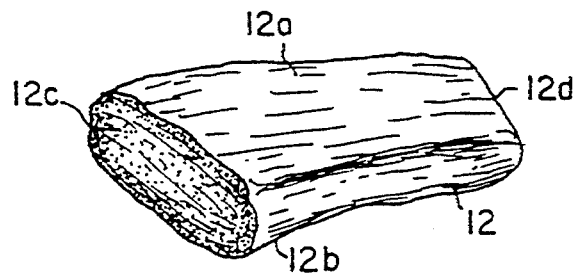
FIG. 2 is a perspective view of a breast cut which has been partially dressed in accordance with the method of the present invention.
Figure 3:
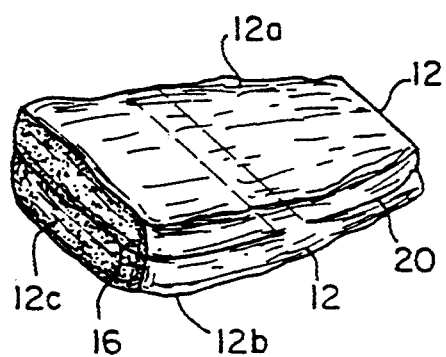
FIG. 3 is a perspective view of a breast cut which has been further partially dressed in accordance with the method of the present invention.

Referring now to FIGS. 1, 2 and 3, to make the food product 10 of the present invention from an edible material 12, such as a breast cut of poultry, it is preferred that a full half of a boneless chicken breast be squared off at its ends by cutting along two generally parallel spaced cut lines 34 to form the first and second end surfaces 12c, 12d. It is understood by those skilled in the art that the present invention is not limited to squared off first and second end surfaces. For instance, the step of squaring off the chicken breast could be omitted and the first and second cut lines 16, 20 could be directly applied to the breast as removed from the chicken.

A knife or other cutting apparatus could be used to cut the edible material 12. However, it is understood by those skilled in the art that the edible material 12 could be formed in other manners without departing from the spirit and scope of the invention. For instance, as is well understood in the food product art, machines exist for mixing, cutting and forming edible materials automatically and, therefore, such machines could be used to form the edible material 12 of the present invention.

Once the edible material or chicken breast 12 has been squared off, as shown in FIG. 2, the first end surface 12c of the material 12 is then cut along the first cut line 16 the second distance. The second end surface 12d of the material 12 is then cut along the second cut line 20 the third distance. As mentioned above, the third distance plus the second distance is less than the first distance to establish the uncut core area 22 between the first and second end surfaces 12c, 12d. The material 12 is then cut from the upper surface 12a to the lower surface 12b along the plurality of spaced generally parallel third cut lines 26 between the first end surface 12c and the core area 22. Similarly, the material 12 is cut from the upper surface 12a to the lower surface 12b along the plurality of spaced generally parallel fourth cut lines 30 extending between the second end surface 12d and the core area 22 such that a plurality of strips of material 32 extend from the core area 22 toward the first and second end surfaces 12c, 12d, as best shown in FIG. 4.

At this point, the food product 10 is in condition for being prepared with seasonings, spices and other flavoring or enhancement substances. For instance, the food product 10 could be marinated in a sauce, such as a lemon or garlic sauce and then coated with flour. The food product 10 is then deep fried such that the strips of material 32 extend outwardly from the core area 22 in a random manner to form a cluster, as shown in FIG. 5. The strips of material 32 are then easily removed from the core area 22 by the consumer grasping individual strips of material 32 with the consumer's fingers and breaking the same from the core area 22. The consumer can directly consume the strips of material 32 or dip the strips of material 32 in a sauce, such as a barbecue sauce, prior to consumption.

While in the present embodiment it is preferred that the food product 10 be deep fried, it is understood by those skilled in the art that heat may be applied to the food product 10 in any manner. In addition, microwave energy could also be applied to the food product 10 without departing from the spirit and scope of the invention.

From the foregoing description, it can be seen that the present invention comprises a food product and method of making the same. It will be appreciated by those skilled in the art that changes and modifications may be made to the above-described embodiment without departing from the broad inventive concepts thereof. For instance, the first and second cuts could be omitted to create a single layer of strips of material 32 (not shown). It is understood, therefore, that the present invention is not limited to the particular embodiment disclosed, but it is intended to include all modifications and changes which are within the spirit and scope of the invention, as defined by the appended claims.

I claim:

1. A food product comprising:

an unprocessed animal muscle material having an upper surface and a lower surface, the upper and lower surfaces being spaced apart a predetermined distance and extending generally parallel with respect to each other, the material including a first end surface and a second end surface, the first and second end surfaces being spaced apart a first distance;

a first cut line through the first end surface of the material extending between the upper and lower surfaces a second distance;

a second cut line through the second end surface of the material extending between the upper and lower surfaces a third distance, said third distance combined with said second distance being less than said first distance to establish an uncut core area between said first and second end surfaces;

a plurality of spaced, generally parallel third cut lines in the material from the upper surface to the lower surface extending between the first end surface and said core area; and a plurality of spaced generally parallel fourth cut lines in the material from the upper surface to the lower surface extending between the second end surface and said core area, the location of the first cut line, the second cut line, the plurality of third cut lines and the plurality of fourth cut lines and the predetermined distance between the upper and lower surfaces being selected such that a plurality of strips of material of predetermined size extend outwardly from said core area in a random manner toward the first and second end surfaces, and wherein said strips of material are readily removable from said core area by grasping each of said strips and breaking each grasped strip from said core area.

2. The food product in accordance with claim 1 wherein the unprocessed animal muscle material comprises a breast cut of poultry.

3. A food product comprising:

an unprocessed animal muscle material having an upper surface and a lower surface, the upper and lower surfaces being spaced apart a predetermined distance and extending generally parallel with respect to each other, the material including a first end surface and a second end surface, the first and second end surfaces being spaced apart a first distance;

a first cut extending through the first end surface along a first cut line extending generally parallel to the upper surface, said first cut extending a second distance;

a second cut extending through the second end surface along a second cut line extending generally parallel to the upper surface, said second cut extending a third distance, said third distance combined with said second distance being less than said first distance to establish an uncut core area between said first and second cuts;

a plurality of third cuts extending from the upper surface to the lower surface along a corresponding plurality of spaced generally parallel third cut lines, said third cut lines extending between the first end surface and said core area; and a plurality of fourth cuts extending from the upper surface to the lower surface along a corresponding plurality of spaced generally parallel fourth cut lines, said fourth cut lines extending between the second end surface and said core area, whereby a plurality of strips of material extend outwardly from the core area in a random manner toward the first and second end surfaces and are readily removable by grasping each of said strips and breaking each grasped strip from said core area.

4. A food product made in accordance with claim 3 wherein the edible material is a breast cut of poultry.

5. A food product made in accordance with claim 3 wherein said third and fourth cuts are spaced a distance with respect to each other within the range of 0.125 to 0.500 inches.

6. A food product comprising:

an unprocessed animal muscle material having an upper surface and a lower surface, the upper and lower surfaces being spaced apart a predetermined distance and extending generally parallel with respect to each other, the material including a first end surface and a second end surface, the first and second end surfaces being spaced apart a first distance;

a first plurality of spaced generally parallel cut lines from the upper surface to the lower surface, the first plurality of cut lines extending from the first end surface toward the second end surface a second distance; and a second plurality of spaced generally parallel cut lines from the upper surface to the lower surface, the second plurality of cut lines extending from the second end surface toward the first end surface a third distance, said third distance combined with said second distance being less than said first distance, thereby defining an uncut core area between said first and second end surfaces, wherein the spacing of the cut lines extending from the first and second end surfaces and the predetermined distance between the upper and lower surfaces are selected such that a plurality of strips of material of predetermined size extend outwardly from said core area in a random manner toward the first and second end surfaces, and wherein each of said strips is readily removable from said core area by grasping each of said strips and breaking each grasped strip from said core area.

7. The food product in accordance with claim 6 wherein the unprocessed animal muscle material comprises a breast cut of poultry.

8. A food product comprising:

an unprocessed animal muscle material having an upper surface and a lower surface, the upper and lower surfaces being spaced apart a predetermined distance and extending generally parallel with respect to each other, the material including a first end surface and a second end surface, the first and second end surfaces being spaced apart a first distance;

a plurality of first cuts extending from the upper surface to the lower surface along a corresponding plurality of spaced generally parallel first cut lines, said first cut lines extending a second distance; and a plurality of second cuts extending from the upper surface to the lower surface along a corresponding plurality of spaced generally parallel second cut lines, said second cut lines extending a third distance, said third distance combined with said second distance being less than said first distance to establish an uncut core area between said first and second end surfaces, whereby a plurality of strips of material extend outwardly from the core area in a random manner toward the first and second end surfaces and are readily removable by grasping each of said strips and breaking each grasped strip from said core area.

9. A food product made in accordance with claim 8 wherein the edible material is a breast cut of poultry.

10. A food product made in accordance with claim 8 wherein said first and second cuts are spaced a distance with respect to each other within the range of 0.125 to 0.500 inches.

11. A food product comprising:
an unprocessed animal muscle material having an upper surface and a lower surface, the upper and lower surfaces being spaced apart a predetermined distance and extending generally parallel with respect to each other, the material including a first end surface and a second end surface, the first and second end surfaces being spaced apart a first distance;

a first cut extending through the first end surface of the material along a first cut line for a second distance, said second distance being less than said first distance to establish an uncut core area proximate said second end surface;

a plurality of spaced generally parallel second cut lines from the upper surface to the lower surface extending between the first end surface and said core area, the location of the first cut line, the spacing of the second cut lines and the predetermined distance between the Upper and lower surfaces being selected such that a plurality of strips of material of predetermined size extend outwardly from said core area in a random manner toward the first and second end surfaces and are readily removable from said core area by grasping each of said strips and breaking each grasped strip from said core area.

12. The food product in accordance with claim 11 wherein the unprocessed animal muscle material comprises a breast cut of poultry.

13. A food product comprising:
an unprocessed animal muscle material having an upper surface and a lower surface, the upper and lower surfaces being spaced apart a predetermined distance and extending generally parallel with respect to each other, the material including a first end surface and a second end surface, the first and second end surfaces being spaced apart a first distance;

a first cut extending through the first end surface along a first cut line extending generally parallel to the upper surface, said first cut extending a second distance, said second distance being less than said first distance to establish an uncut core area proximate said second end surface;

a plurality of second cuts extending from the upper surface to the lower surface along a corresponding plurality of spaced generally parallel second cut lines, the second cut lines extending between the first end surface and said core area whereby a plurality of strips of material extend outwardly from the core area in a random manner toward the first and second end surfaces and are readily removable by grasping each of said strips and breaking each grasped strip from said core area.

14. The food product in accordance with claim 13 wherein said material is cooked via deep frying.

* * * * *